US010528134B2

(12) United States Patent
Stouffer

(10) Patent No.: US 10,528,134 B2
(45) Date of Patent: Jan. 7, 2020

(54) ONE-HANDED INPUT CHORDING USER INPUT DEVICE FOR CONVERTING FINGER MOVEMENTS INTO DIGITAL INPUT

(71) Applicant: Mark Stouffer, Brea, CA (US)

(72) Inventor: Mark Stouffer, Brea, CA (US)

( * ) Notice: Subject to any disclaimer, the term of this patent is extended or adjusted under 35 U.S.C. 154(b) by 0 days.

(21) Appl. No.: 15/979,434

(22) Filed: May 14, 2018

(65) Prior Publication Data

US 2018/0329491 A1 Nov. 15, 2018

Related U.S. Application Data

(60) Provisional application No. 62/505,961, filed on May 14, 2017.

(51) Int. Cl.
*G06F 3/01* (2006.01)
*G06F 3/033* (2013.01)
*G06F 3/02* (2006.01)
*G06F 3/023* (2006.01)

(52) U.S. Cl.
CPC .............. *G06F 3/014* (2013.01); *G06F 3/016* (2013.01); *G06F 3/017* (2013.01); *G06F 3/0202* (2013.01); *G06F 3/023* (2013.01); *G06F 3/0219* (2013.01); *G06F 3/0235* (2013.01); *G06F 3/033* (2013.01)

(58) Field of Classification Search
CPC ...... G09G 5/00; G09G 3/04812; G06F 3/014; G06F 3/017; G06F 3/016; G06F 3/0202; G06F 3/0319; G06F 3/023
See application file for complete search history.

(56) References Cited

U.S. PATENT DOCUMENTS

| 5,900,864 A * | 5/1999 | Macdonald | G06F 3/0489 341/21 |
| 2003/0016985 A1* | 1/2003 | Patel | G06F 3/021 400/489 |
| 2004/0012557 A1* | 1/2004 | Daniel | A63F 13/06 345/156 |
| 2006/0190836 A1* | 8/2006 | Ling Su | G06F 1/1616 715/773 |
| 2011/0260996 A1* | 10/2011 | Henricson | G06F 3/016 345/173 |
| 2013/0046544 A1* | 2/2013 | Kay | G06F 3/04883 704/275 |
| 2013/0135223 A1* | 5/2013 | Shai | G06F 3/014 345/173 |
| 2013/0180385 A1* | 7/2013 | Hamilton | G10H 1/0016 84/603 |
| 2013/0207890 A1* | 8/2013 | Young | G06F 3/014 345/156 |

(Continued)

*Primary Examiner* — Steven P Sax

(57) ABSTRACT

A one-handed input chording user input device for converting finger movements into digital input has a chassis configured to conform to human fingers with a plurality of articulating finger frames connected adjacent to each other, a plurality of user input elements, a processing device, and a signal transmitter. The plurality of user input elements is connected around the chassis in order to capture flexion, extension, adduction, and abduction movements of the plurality of articulating finger frames. The processing device interprets signals received from the plurality of articulating finger frames into desired output communication elements such as text characters. The signal transmitter sends the interpreted output to a computing device.

9 Claims, 6 Drawing Sheets

(56) References Cited

U.S. PATENT DOCUMENTS

| | | | | |
|---|---|---|---|---|
| 2014/0176452 A1* | 6/2014 | Aleksov | ................ | G06F 3/0412 345/173 |
| 2016/0082319 A1* | 3/2016 | Macri | ................ | G06F 19/3481 434/257 |
| 2017/0206691 A1* | 7/2017 | Harrises | ................ | G06T 11/60 |

* cited by examiner

ONE-HANDED INPUT CHORDING USER INPUT DEVICE FOR CONVERTING FINGER MOVEMENTS INTO DIGITAL INPUT

The current application claims a priority to the U.S. Provisional Patent application Ser. No. 62/505,961 filed on May 14, 2017.

FIELD OF THE INVENTION

The present invention relates generally to computer data entry. More particularly, the present invention relates to an ergonomic user input device for capturing multiple finger movements as input.

BACKGROUND OF THE INVENTION

Mobile computing and use of "smart phones" has improved rapidly and spread to all continents and cultures. The rapid growth is due to vastly increased usefulness of the devices. Hardware and software improvements make computational devices powerful presenters of information. They also collect a wide variety of information from the users' environment, such as GPS location, video, voice, bar code scanning, and small amounts of written text.

Text input technology for the user has lagged far behind in development. This is unfortunate because textual content is the most significant transmitter of conceptual material from the user.

Many users need to produce, log, or transmit specific textual content using a variety of non-standard characters while they are mobily computing. Emergency medical technicians, first responders, security personnel, and reporters need to transmit important, specific data and they would often benefit from being able to send it textually rather than audibly, and without having to look down at their text input interface or device.

Current keyboards require the user to reposition their fingers by lifting them off the device to find and press different keys, or by moving the fingers to a different location on the surface of the device. For instance, QWERTY keyboards require you to move each finger to a variety of different keys in order to enter different characters. The Swype keyboard mobile application requires the user to slide their finger across the surface of a virtual keyboard displayed on the screen. Other one-handed keyboards or keysets require you to press different locations by moving your finger tip to different locations. There are some key sets which allow you to rest your fingers on the same surface without moving them off that surface for the duration of a text entry session, such as the chorded keyset, but those keysets take advantage of only one finger motion: the finger press.

Prior versions of keyboards have had at least one of the following problems:
1. Required repositioning of fingers in order to key in different characters;
2. Were not portable in that they were intended to be placed on a desk or other work surface;
3. Could not be easily placed into a pocket or purse.

The keyboards that require finger repositioning can require the user to look down at their fingering on the text input device. This is the problem with the QWERTY keyboard, which is why the letters are written on each key. A lengthy training period is required before the user is able to type all characters on the keyboard without looking down at the keys. QWERTY keyboards are usually operated directly in front of the user so that if they need to they can look down at their finger positioning or to find a special key.

The present invention seeks to provide a solution to the aforementioned problems as an input device designed to provide the maximum number of finger input movements without requiring the replacement or repositioning of fingers on the device.

The invention device solves these problems by designing the device shape to detect each fundamental finger movement. The most distinguishing characteristics of the invention are:
1. The keys are designed to be triggered by natural finger movements.
2. The fingers do not need to be repositioned in the device in order to actuate any of the keys.
3. The motion of the finger pressing the key is relative only to the stable position of the invention in the users hand itself and not to any other surface or mount. This makes the invention particularly useful for mobile applications including situations where the user is walking, running, or talking part in other activities.
4. The frame of reference for all the keystroke movements is relative only to the invention device itself. The user does not need to concern himself with any other frames of reference when keying text. He can focus on and isolate in his mind each of the keystroke movements, which the device can also teach him.

Finger flexion, extension, hyper-extension, abduction and adduction movements may all be detected by the shape of the present invention. The device may include a grip with affordances for each finger and thumb of the hand, such that when the user holds the invention their fingers come to rest on comfortable seats for each finger and each section of the finger. Each of the finger affordances may be movable levers which rotate or press in accordance with natural finger movements by pivoting or pressing approximately where each finger joint pivots. The lever movements are arranged in such a way as to cause the actuating of momentary switches or other sensors in the device. The first switch actuated in a chord sequence causes the beginning of a code signal in the device. Subsequent switch presses are registered as part of a character code. When all the switches are released a specific character is calculated from the sequence of switches pressed.

Terms used:
Keystroke: a single-click activation of a single switch on a single joint of a finger.
Character: the character report that is transmitted to the text input receiver.
Character chord: a collection of one or more keystrokes into a set, which produces a character report through the HID transmitter.
HID transmitter: The (human interface device) transmitter that sends characters from this invention device to a text-input receiver such as a mobile phone, computer, or any other device that can receive text input via any standardized text input signal.
Alias/shortcut: a collection of keystrokes that are not assigned to any character, but which can then be used for character sets, whole words, or text commands.

The hand has a natural axis that is developed in earliest youth and provides for the coordination of the fingers and thumb so that they can be used to pinch. This is probably one of the first coordinate systems a child develops since they are always available to the child to study. The fingers can be wrapped to form a grip. This is a move that infants are good at, so good in fact that newborns can often lift their own weight by gripping a wooden dowel which can be lifted as a cross-bar over their heads. The grip coordination of the fingers to the palm probably starts even before we are born.

Soon, the infant is able to pinch the thumb to the forefinger. He is able to reliably and automatically orient the forefinger and the thumb do that their tips touch and press together to form a clamp with objects can be manipulated by. After that he can quickly develop the same ability with each of the other fingers. In this way his fingers become indexable.

Humans are distinguished from other primates by saying that we have opposable thumbs. Our thumbs can be pinched against our fingers. But our fingers are also indexable, meaning each finger can be flexed individually and with great dexterity. It allows such things as counting on one's fingers. The present invention takes advantage of human finger indexability by aligning the keystroke action specifically to the natural flexion and extension of each finger. The flexion of each finger joint is captured as a keystroke. The extension of the proximal joint, the joint connecting the finger to the palm, is captured as a keystroke. In this way the fingers do not have to be moved to a position before activating a keystroke. The movement is the keystroke.

There are a variety of existing text input coordinate systems. As people find text input more useful in their lives, such as in professional or personal endeavors, it becomes more important to improve the efficiency of the text input process systems. To improve the text input process, the coordinate systems have been improved and made more stable. Here is a brief review of common text input tools and improvements, and the trend that they illustrate.

Keyboard and Mouse: The keyboard and mouse combination requires use of the elbow coordinate system to move between the keyboard and mouse. Once the fingers are on the keyboard they are oriented according to the home row keys, "asdf" for the left hand and "jkl;" for the right hand. The home row keys associated with the index fingers, "f" and "j", are usually marked with bumps so that they can be identified by the index fingers without requiring visual orientation with the eyes. In this way the fingers can be positioned into their regular orientation and coordinate system without requiring the use of a second sense organ and eye-to-hand coordination, which might impede other activities and requires extra mental processing faculties.

Once the fingers are oriented on the homerow keys they still need to be able to reach all the other keys on the keyboard. Each finger, including the index fingers, are required for access to additional keys. That means that the index fingers must regularly move from their coordinate basis position, losing touch with the keys that have bumps on them, and losing tactile confirmation of the center of their coordinate system. Then, once the alternate key has been pressed, the fingers are moved back to their basis position, which requires replacement of the index fingers. Moving fingers to alternate keys requires stretching the fingers in relation to the home row keys a certain particular distance, and at a certain angle, which must be remembered for each key, and which is different on a variety of keyboards.

Moving to the mouse and back again: Each time a user has to move his hand to the mouse he moves his right hand away from the home row keys. He then processes activities in the mouse coordinate system (x-y movement, right and left-click, and mouse-wheel) he then has to move his hand back to the keyboard by manipulating his shoulder and elbow coordinate systems. His entire hand must be moved through a distance that does not provide any input data. The movement of the hand is simply required because the right hand is used for both the keyboard and mouse input, each having their own coordinate systems, and those separate input systems must awkwardly be located at a distance from each other. Each time the user uses the mouse their hand loses context with the keyboard and must be realigned with the home row keys. It is a non-optimal arrangement and people have been searching for a solution to it ever since the mouse was created.

Because of the problems of losing the context of the coordinate system, and the variety of distances and angles that must be memorized for each type of keyboard, learning to type rapidly on a regular keyboard/mouse combination can be frustrating and often requires looking down at the keyboard.

Keyboard and Trackpad: The trackpad/touchpad provides a partial solution to moving the hand to the mouse. With the trackpad/touchpad the user can access all the functionality of the trackpad with a simple wrist movement alone. It is an improvement over the shoulder and elbow movements required for the mouse, but it still requires realigning with the home row keys. It is better than the mouse, but it is not good enough.

IBM Trackpoint: IBM made an improvement to the keyboard/mouse combination by providing a red "TrackPoint", which is a combination finger-operated joystick/button located in the center of the keyboard. It allowed users to keep most of their fingers on the home row keys so the hands need not lose the coordinate system context of the keyboard every time they operate the mouse cursor. However it required that the user wait for the mouse cursor to move across the screen. Since the TrackPoint was at a fixed location on the keyboard, mouse motion had to be inferred by the length of time the TrackPoint was displaced in the direction of movement. With careful settings this delay could be minimized but not eliminated. The fine-tuned settings could not easily be transferred to other computers and didn't work at all with non-IBM computers. It, also, only worked on IBM laptops.

Swype Software Keyboard for Smartphones:

The Swype keyboard makes an improvement on the mobile software keyboard simply by removing the requirement that the finger be lifted off the mobile device screen between keystrokes. In this way the Swype keyboard is like the current invention in that it keeps the finger in the context of the keyboard coordinate system for the duration of a whole word. The finger can sense the direction it is being dragged in through the friction on the pad of the finger. This provides local sensory feedback straight to the hand about those movements, not requiring the use and synthesis of auditory sensations as the audible beep of a keyboard does. The user still must use vision to initially orient the finger on the keyboard, and for error-checking in longer words, so it is still not at the ergonomic level of the current invention.

Gest: Gest is still in development and they have some large usability hurdles yet to overcome, but they have identified some of the same problems. Their approach is generally high-tech, requiring imaginative uses of delicate sensors and advanced signal processing to interpret multi-joint hand gestures. Instead of identifying the unit of finger movements, they are trying to divine gesture units in general, and that is why they are seeking extensive non-trivial programming help through their software development kit, which they have published and are promoting to interested programmers.

Voice input: Many systems allow voice input of text, such as Amazon's Alexa, Apple's Ski, Microsoft's Cortana, and others, but there are at least three constant problems with this method:

1. Other people can hear all of the text commands you are issuing. There are many cases where this is not desirable either for the user, or for the surrounding people.
2. Nearby people can purposefully, or inadvertently, overwrite or intermingle their voice statements with the intended user's statements.
3. The audio environment must be low-noise in order for the words to be understood.
4. There are also security concerns with an always-on microphone listening for voice commands and in many security sensitive environments this tool is not even a possible option.

Reliable text input bypasses each of these shortcomings. One thing that people most want in text input is reliability. They want to be sure that the statements they are sending are the statements they intended to send. Because voice input and gesture input require extensive non-trivial data processing in order to decipher the text, the user has to wait to see if their text was deciphered correctly.

With a tactile keystroke text input device the user has a very short feedback loop in the hand that can validate correct keying of the message and allowing for continuous improvement of their keying expertise. Over time, such training should lead to automatization of the keying process so that it becomes a "second nature".

Command Line Interface (CLI): The command line interface (CLI) allows a user to interface with a program by typing text commands into a "command prompt" text area, usually on a computer screen. The Windows command prompt or the Mac "terminal" are examples of this type of interface. CLIs have existed since the early days of computer programming interfaces, but they are going through a phase of renewed development and are well-understood by application developers because they are simple to implement, require low computer processing overhead, and present themselves consistently across a wide variety of computer interfaces without requiring considerations of screen size and orientation, unlike graphical user interfaces (GUI) which require extensive testing on a wide variety of screen sizes and orientations.

The current device, because of its immediate orientation to the text-input context, allows quick input to any available CLI for uses such as sending SMS messages, opening any program, initiating searches, initiating phone calls, logging events with text comments and hashtags, initiating any process that an application provides a CLI for.

The present invention has the added benefit that it provides a full keyboard character set. Many command line interfaces require special characters, such as "''", "$", or "[", to perform special operations. Most alternate keyboards are difficult to enter special characters with. They require navigating to an alternate screen, or in the case of voice input, the use of special commands. On the present invention no special actions are required. Special characters are simply another collection of keystrokes to be learned like the basic keystrokes and within the same character chord context.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a one-handed ergonomic user input device for use with electronic devices such as, but not limited to, personal computers, laptop computer, mobile phones, and any other computing devices that can receive electronic input. Preferably, the present invention will contain an electronic circuit board which provides a wireless connection to a computing device, such as, but not limited to, a cell phone, laptop, barcode scanner, or radio transmitter. For the purpose of this description we can use the example of a Bluetooth connection, which provides an interface for a wide variety of electronic devices, but the invention may work with any device that requires text input or text commands. The invention may also directly interface with cell phone networks using their interfaces to send things such as text messages, email, or other commands of any kind accepted those networks. It may also be used to interface with any other kind of computing, data-collection, or telecommunications systems by using the wireless interface.

Figure 1:
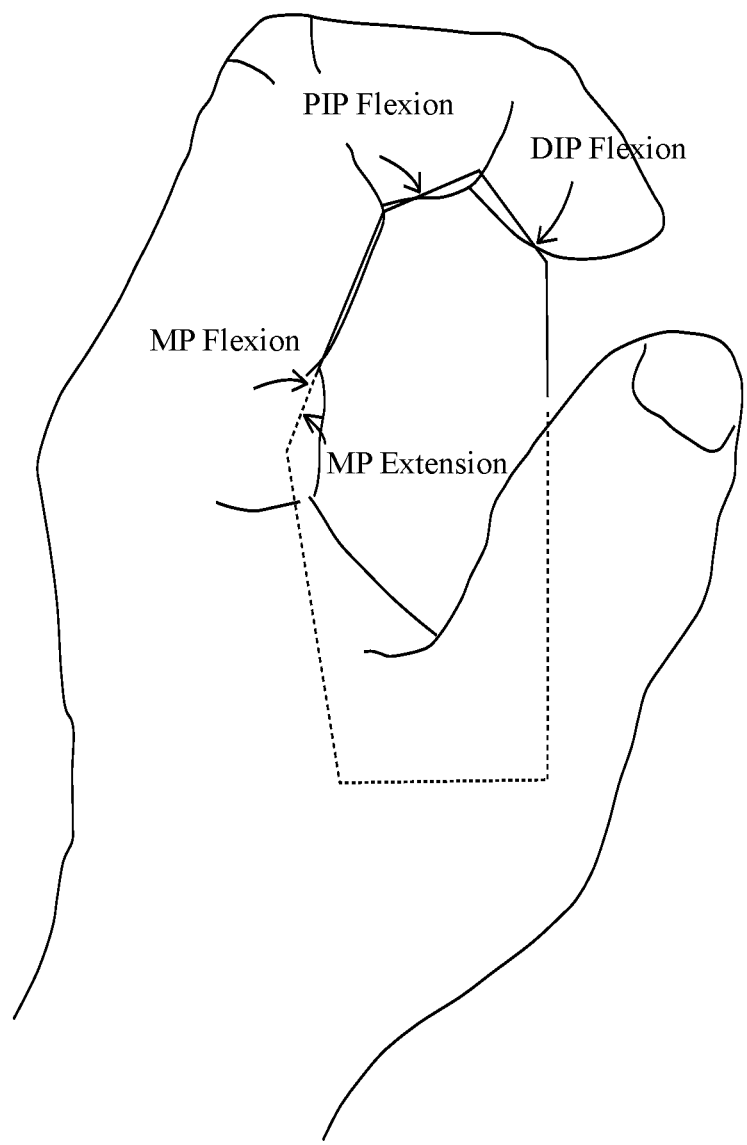
FIG. 1 is a side view illustration of various finger flexion and extension motions captured with the present invention.
Figure 2:
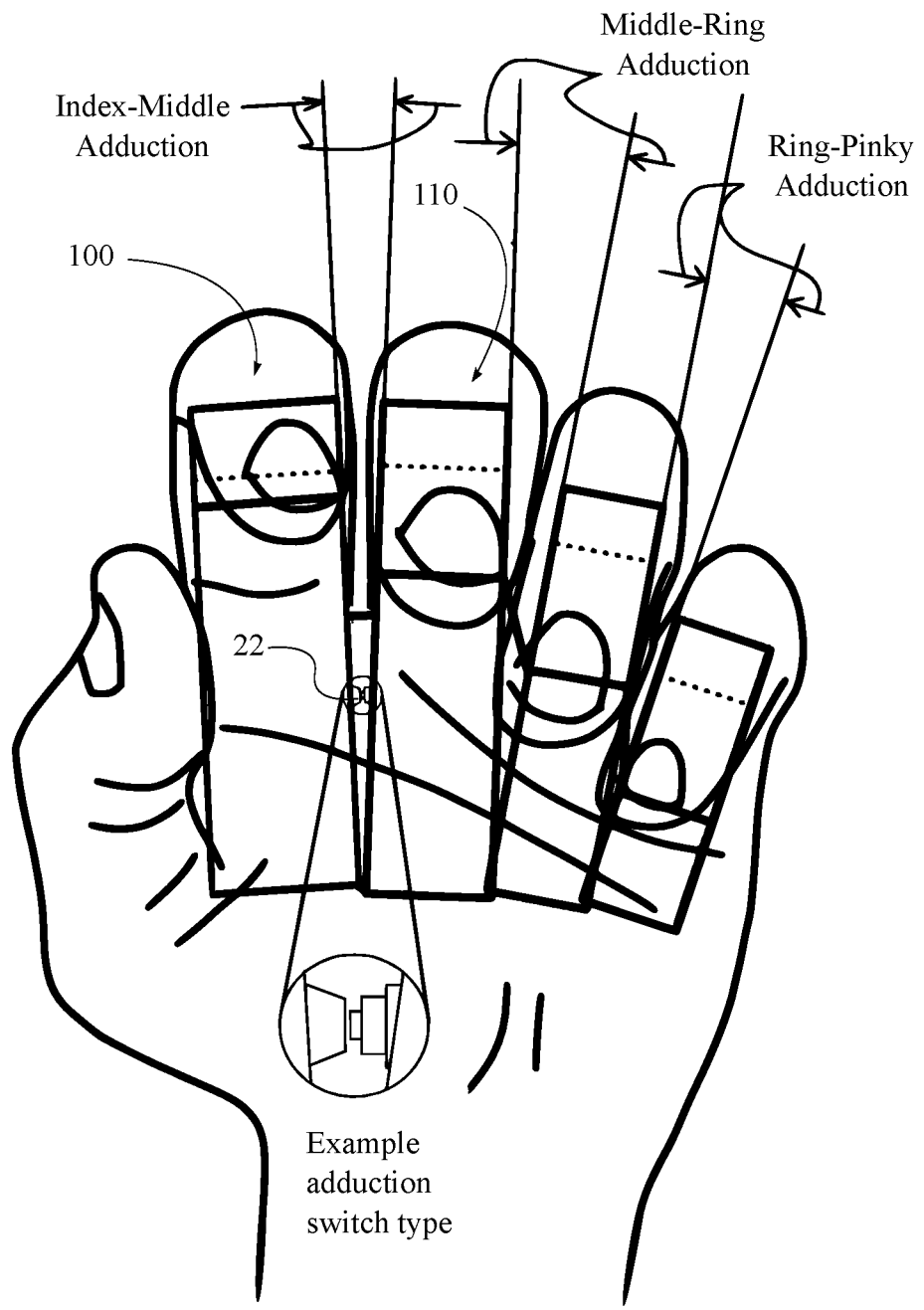
FIG. 2 is a front view illustrating adduction motions captured with the present invention.

Since several finger movements can be captured by the device of the present invention for each finger that the user uses, the finger movement and keystroke combinations can be translated into multiple characters per finger. FIGS. 1-2 illustrate several types of finger movement to be captured.

Keystrokes will be recorded as chords, which means multiple keys may be pressed simultaneously and the specific combination of keys will designate the character that will be recorded for that keystroke combination, or chord. Keystroke chording will be explained further on in the current disclosure.

Figure 3:
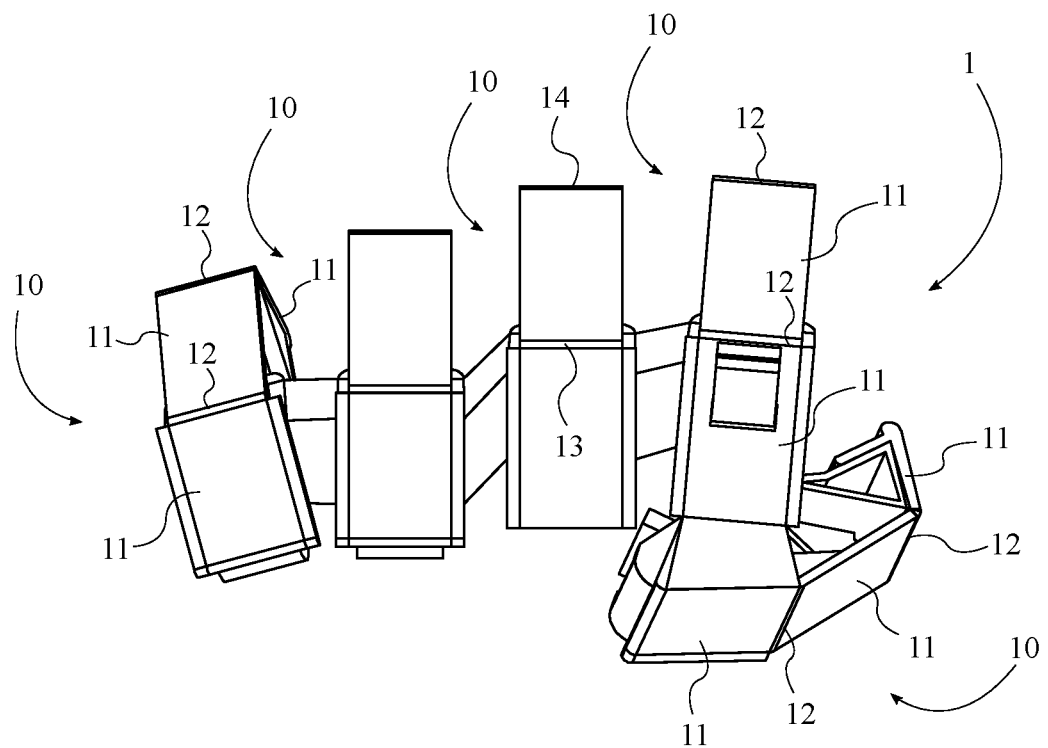
FIG. 3 is a rear view of one embodiment of the present invention.
Figure 4:
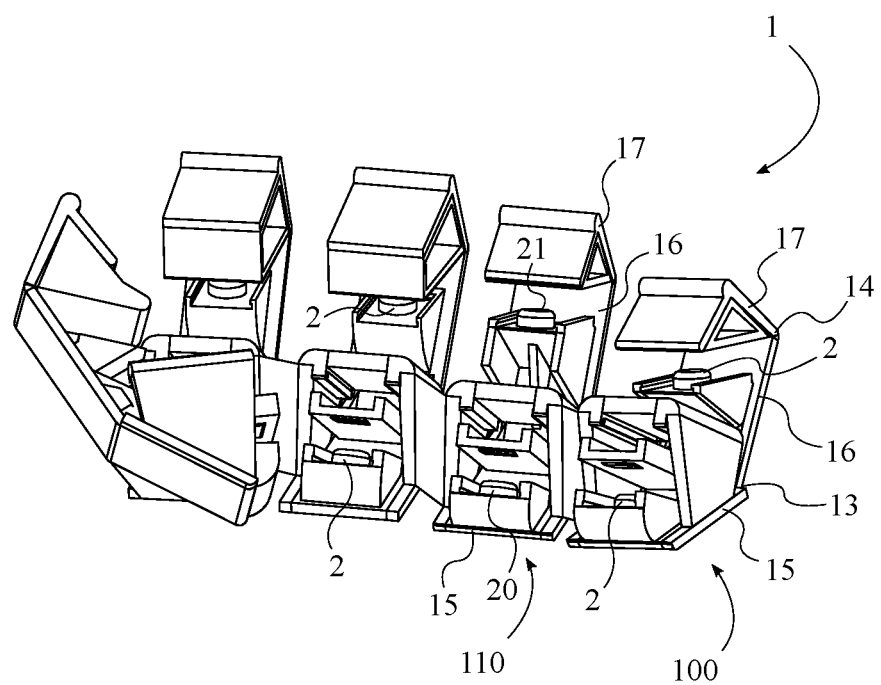
FIG. 4 is a front perspective view of one embodiment of the present invention.
Figure 5:
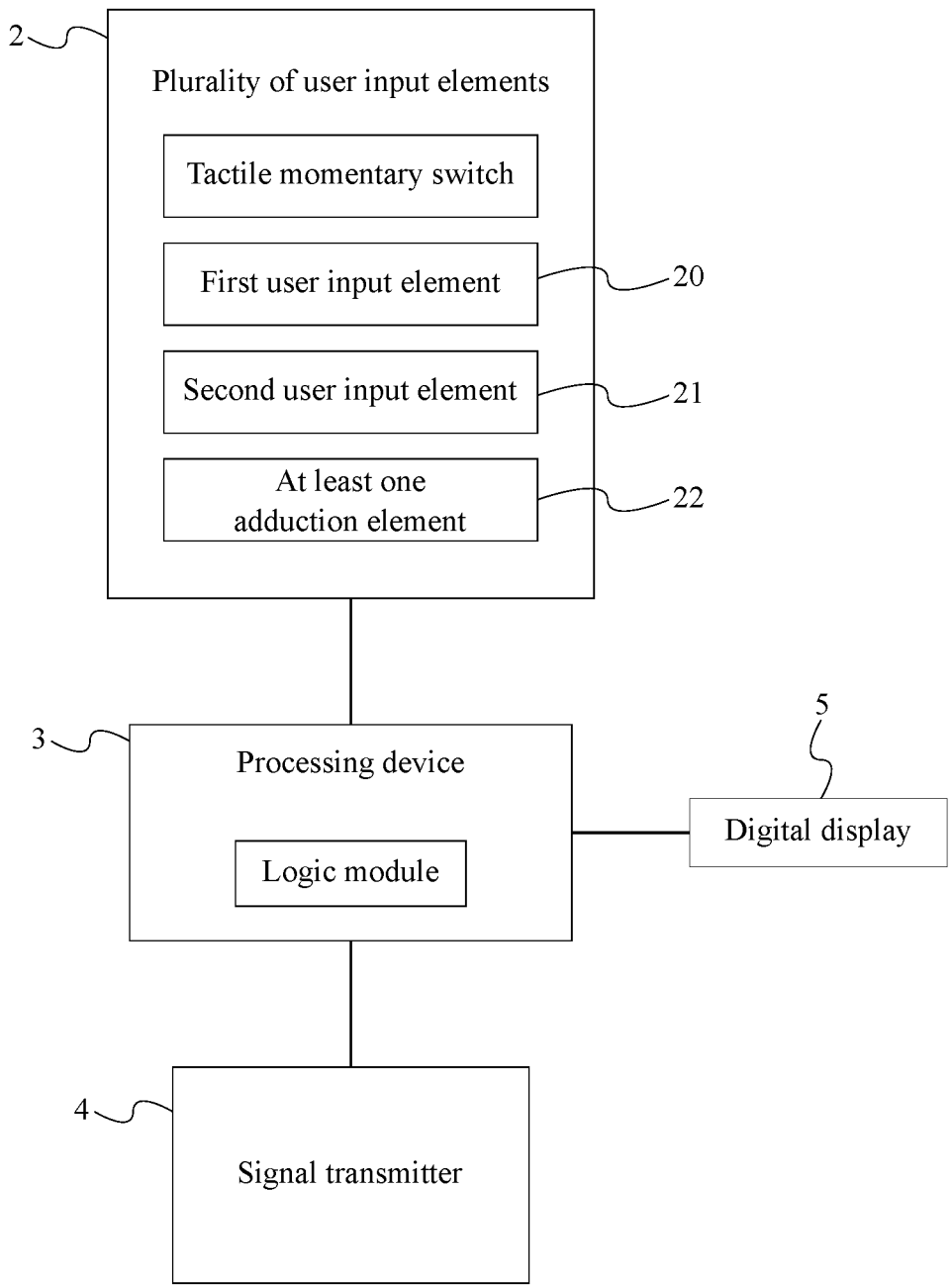
FIG. 5 is a general diagram of the electronic connections of the present invention.

Referring to FIGS. 3-5, in general, the present invention comprises a chassis 1, a plurality of user input elements 2, a processing device 3, and a signal transmitter 4.

The chassis 1 may be generally understood to be the main physical structure of the present invention and is configured to conform to human fingers and/or otherwise utilize motion of a user's hand and/or fingers in order to actuate the plurality of user input elements 2. In various embodiments of the present invention, the chassis 1 may be made from any desirable material, such as, but not limited to, plastic, metal, various polymer materials, or/any other desired materials or combination of materials.

Each of the plurality of user input elements 2 should be understood to be an input element such as, but not limited to, a button, switch, or other user interface element able to capture a user input motion of one or more the user's fingers while wearing the present invention. The plurality of user input elements 2 is connected to the chassis 1, distributed around the chassis 1, and electronically connected to the processing device 3. In general, the plurality of user input elements 2 is configured and positioned around the chassis 1 in order to capture flexion, extension, adduction, and abduction movements of the user's fingers. The specific type of user input element of each of the plurality of user input elements 2 may vary. For example, in some embodiments, at least one or all of the plurality of user input elements 2 may be a tactile momentary switch. In various embodiments, at least one or all of the plurality of user input elements 2 may be different types of input elements, so long as the desired motions of the user's fingers are able to be captured.

The processing device 3 may be any appropriate electronic device capable of receiving input signals from the plurality of user input elements 2 and interpreting the input signals into a desired output. The processing device 3 is electronically connected to the signal transmitter 4, which receives the desired output and then transmits the desired output to an appropriate recipient device such as a personal computer, tablet smartphone or other device. The processing device 3 may interpret one or multiple user input signals received from the plurality of user input elements 2 into a text character, combination of characters, or other electronic communication elements. Various chorded combinations of user input signals from the plurality of user input elements 2 may be assigned to different communication elements in the processing device 3. In some embodiments, the processing device 3 is a logic module, wherein the logic module is configured to interpret user input signals received from the plurality of user input elements 2.

In some embodiments, the present invention may further comprise a digital display electronically connected to the processing device 3. The digital display may be connected to the chassis 1 in any desirable location. The digital display may be useful by displaying in real-time the current result of any character chord being entered.

In the preferred embodiment of the present invention, as seen in FIG. 3, the chassis 1 comprises a plurality of articulating finger frames 10, and the plurality of articulating finger frames 10 is serially positioned adjacent each other to correspond to the typical five-fingered structure of a human hand. In various embodiments, the chassis 1 may comprise five articulating finger frames 10, or may comprise less than five articulating finger frames 10 if desired. Furthermore, each of the plurality of articulating finger frames 10 comprises a plurality of finger segments 11 and at least one hinge 12. The plurality of finger segments 11 is serially connected to each other through the at least one hinge 12 for each of the plurality of articulating finger frames 10.

In some embodiments, the plurality of articulating finger frames 10 is serially connected adjacent to each other. More particularly, as shown in FIG. 4, in some embodiments each of the plurality of articulating finger frames 10 comprises a base segment 15, a proximal segment 16, and a distal segment 17. The base segment 15 of an arbitrary articulating finger frame 100 from the plurality of articulating finger frames 10 is connected adjacent to the base segment 15 of an adjacent articulating finger frame 110 from the plurality of articulating finger frames 10, wherein the arbitrary articulating finger frame 100 is connected adjacent to the adjacent articulating finger frame 110. The proximal segment 16 is connected adjacent to the base segment 15 through a first hinge 13 from the plurality of hinges, and the distal segment 17 is connected adjacent to the proximal segment 16 opposite the base segment 15 through a second hinge 14 from the plurality of hinges. The base segment 15 of the arbitrary articulating finger frame 100 is positioned side by side with the base segment 15 of the adjacent articulating finger frame 110, so that the respective base segments 15 lay flat against the palm of the user when the finger frames are positioned in alignment with the fingers of the user. One exception to the previous statement in some embodiments may be that a thumb frame of the plurality of articulating finger frames 10, mounted to the chassis 1 such that the base segment 15 of the thumb frame is positioned at the ball of the thumb of the user, and would not sit flat against the user's palm.

In the preferred embodiment, the plurality of user input elements 2 is configured to capture flexion, extension, adduction, and abduction movements of the plurality of articulating finger frames 10. In most embodiments, the configuration of the plurality of user input elements 2 to capture the desired motions of the user's finger through the plurality of finger frames depends on the placement of the plurality of user input elements 2 around the chassis 1.

In some embodiments, as seen in FIG. 4, a first user input element 20 from the plurality of user input elements 2 is connected between the base segment 15 and the proximal segment 16 in order to capture flexion motion between the base segment 15 and the proximal segment 16. While utilizing the present invention, when the user flexes their finger such that the proximal segment 16 rotates about the first hinge 13 relative to the base segment 15, the first user input element 20 is activated and an input signal corresponding with the first user input element 20 is registered by the processing device 3. In some embodiments, the first user input element 20 may be a momentary push-button. Thus, the first user input element 20 is activated when the proximal segment 16 and the base segment 15 experience a flexion movement and the momentary push-button is depressed. Similarly, a second user input element 21 from the plurality of user input elements 2 is connected between the proximal segment 16 and the distal segment 17. The first user input element 20 is thus configured to capture a flexion movement of a proximal interphalangeal joint of the user's finger, while the second user input element 21 is configured to capture a flexion movement of a distal interphalangeal joint of the user's finger. The first hinge 13 and the second hinge 14 are positioned in order to correspond with the finger joints of the user. Extension movements, opposing the aforementioned flexion movements, may be captured through additional user input elements complementary to the first user input element 20 and the second user input element 21, or may be registered by the processing device 3 as a de-activation of the user input elements capturing the flexion movements.

It is further desirable in the present invention to capture adduction and abduction movements of the user's fingers, where one or more fingers move laterally to contact an adjacent finger. Adduction, it should be noted, is a movement where two fingers are brought together. Abduction is separating two fingers, splaying the fingers apart into a V shape. Thus, referring to FIG. 2, at least one adduction element 22 from the plurality of user input elements 2 may be connected to an arbitrary articulating finger frame 100 from the plurality of articulating finger frames 10, with the at least one adduction element 22 being positioned between the arbitrary articulating finger frame 100 and an adjacent articulating finger frame 110. The at least one adduction element 22 may be connected to the arbitrary articulating finger frame 100 or the adjacent articulating finger frame 110 as desired, or both.

In some embodiments, it is further desirable that each of the plurality of user input elements 2 be configured to provide user feedback upon actuation. This may be a helpful feature to the user in learning to utilize the present invention properly. As such, in some embodiments, at least one or all of the plurality of user input elements 2 is a tactile momentary switch. The tactile momentary switch may provide user feedback through a clicking action when depressed and/or released. In various embodiments, the means of providing user feedback may vary. For example, actuation feedback of the plurality of user input elements 2 may be provided through an audible sound, magnetic reed switch action, one or more haptic motors, or any other desirable means.

One exemplary embodiment of the present invention may described as follows: the present invention is a hand-held text input transmitter device consisting of a mechanical chassis, shaped to capture most natural movements of the fingers of one hand, a set of tactile momentary switches placed throughout the chassis to detect when a finger joint is in flexion or extension, a wire harness to connect all the switches to a logic module, and the logic module being connected to each momentary switch. The chassis is shaped to fit very comfortably in the hand similar to an ergonomic handle or grip. The chassis is shaped so that hinges rotate coincident with the rotation of the joints of each finger. The chassis is of a non-uniform shape and can be easily oriented by the hand without requiring looking at it, or the use of the other hand. In this way the hand can quickly be placed in the proper context of the chassis and initiate text input. The tactile switches provide instant tactile feedback to the finger that the switch has been activated.

The logic module initiates a character chord when any keystroke is initiated, collects subsequent keystrokes into an ordered array, and then interprets and sends the keystroke collection as a text character or alias/shortcut to a human interface device (HID) transmitter. The HID transmitter uses Bluetooth, Wi-Fi, or any other HID transmission method to send the character set to the text input receiver. In some embodiments, any input received through the plurality of user input elements while not paired with an external receiver device may be stored locally on the processing device. Then, when pairing is initiated between the present invention and the external receiver device, the user maybe given the option of importing the cached input.

To better explain the key-chords finger names and the joints of each finger and thumb will be specified. Each of the finger names will be abbreviated and combined with the joint abbreviation in order to specify how the finger motion may be converted to text characters.

Thumb: T; Index finger: I; Middle finger: M; Ring finger: R; Pinky finger: P.

Finger joint nomenclature: Metacarpophalangeal joint (MP): the finger knuckle or joint that joins the finger to the palm of the hand; Proximal interphalangeal joint (PIP): the midway knuckle closest to the metacarpophalangeal joint; Distal interphalangeal joint (DIP): the knuckle closest to the tip of the finger.

Thumb joint nomenclature may be slightly different than the rest of the fingers. Carpometacarpal joint (CMC): the thumb joint nearest the wrist and below the ball of the thumb; Metacarpophalangeal joint (MP): the middle joint of the thumb; IP: the thumb joint nearest the tip of the thumb.

The present invention will have the advantage of allowing more than one keystroke or other input action per finger. For each finger the device of the present invention may be capable of capturing the following movements in one example embodiment. Finger movements to be captured may vary in different embodiments of the present invention.

MP flexion: the grasp action of the proximal phalanx of each finger.

MP extension: the ungripping action of the proximal phalanx, captured on the device by flexing the DIP joint and pulling back to extend the MP joint.

PIP flexion: captured by flexing the second knuckle from the tip of the finger.

DIP flexion: captured by pressing the finger tip against its proper position on the device.

In addition to finger flexion and extension, the adduction or pressing together of a pair of fingers may also be captured by a switch or sensor between the fingers or otherwise actuated by finger adduction. An embodiment of this device may also capture the metacarpophalangeal joint and proximal interphalangeal joint movement of the thumb. Adduction and abduction movements of each finger may also be captured independently.

Action Specification Notation: To simplify the explanation of key sequences, a shorthand notation will be used herein to specify individual actions in accordance with some embodiments of the present invention.

The actuation of a switch is the pressing of a momentary switch. The momentary switch is continuously active until it is released, at which point it is defined as disactuated, meaning the momentary switch is no longer sending a signal that it is active.

The Action Specification A-I-DIP-F specifies the actuation of Index finger DIP flexion. Here is how the Action Specification is assembled:

A-x-xxxx—the Actuation or Disactuation ("A" or "D") is the first component of the action specification, so the example Action Specification would begin with "A."

A-I-xxx-x—the second element is the finger element, so the example would continue with the index finger.

A-I-DIPx—the third element is the joint designator, so the example continues with the DIP joint.

A-I-DIP-F—the final component of the Action Specification is the movement direction, either Flexion (F), Extension (E), or Adduction (A).

The index finger will be used as an example. Each of the other fingers will also have similar actions for their own keystrokes. The Index finger has the following actions:

I-DIP-F—Flexion (F) of the Index (I) finger's distal interphalangeal (DIP) joint.

I-PIP-F—Flexion (F) of the Index (I) finger's proximal interphalangeal (PIP) joint.

I-MP-F—Flexion (F) of the Index (I) finger's metacarpophalangeal (MP) joint.

I-MP-E—Extension (E) of the Index (I) finger's metacarpophalangeal (MP) joint.

It quickly becomes apparent that a method to encode various combinations of the aforementioned inputs into a desired output is necessary. Thus, various combinations of keystrokes may be encoded according to a particular coding method. The following is an illustrative example of one embodiment of such a scheme. The keystroke value tables are given as hypothetical examples. The actual values may be different from the ones listed here without altering the function of the present invention.

Example finger action values:

Index: DIP-F: 0x01; PIP-F: 0x02; MP-F: 0x03; MP-E: 0x04.

Middle: DIP-F: 0x05; PIP-F: 0x06; MP-F: 0x07; MP-E: 0x08.

Ring: DIP-F: 0x09; PIP-F: 0x0A; MP-F: 0x0B; MP-E: 0x0C.

Pinky: DIP-F: 0x0D; PIP-F: 0x0E; MP-F: 0x0F; MP-E: 0x10.

Thumb: IP-F: 0x11; MP-F: 0x12; CMC-F: 0x13; CMC-E: 0x14.

A sequence of inputs combined together may be referred to herein as key chords. In some embodiments, a key chord begins when a key sensor is actuated and ends when all keys return to their default, unactuated position. An example will be presented below. It will be appreciated that this allows for a wide variety of key combinations including multiple actuations of a single switch within a single chord.

Figure 6:
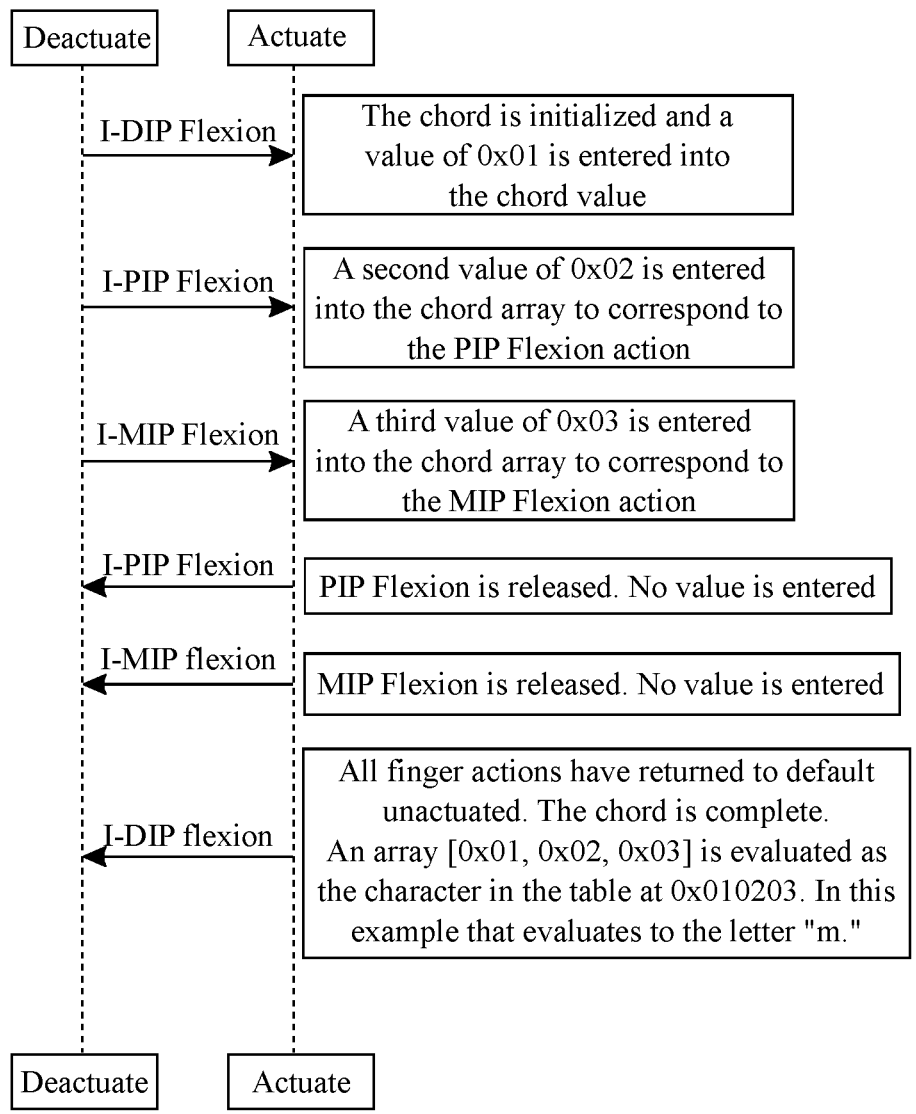
FIG. 6 is a stepwise flow diagram illustrating completion of a chord sequence using the present invention.

Referring to FIG. 6, the following is an example of a possible key-chord sequence:

Chord Sequence 1

1. Actuate Index finger DIP Flexion (A-I-DIP-F), add 0x01 to the chord array;
2. Actuate Index finger PIP Flexion (A-I-PIP-F), add 0x02 to the chord array;
3. Actuate Index finger MP Flexion (A-I-MP-F), add 0x03 to the chord array;
4. Deactuate Index finger MP Flexion (D-I-MP-F), no value needs to be entered for this action;
5. Deactuate Index finger PIP Flexion (D-I-PIP-F), no value needs to be entered for this action;
6. Deactuate Index finger DIP Flexion (D-I-DIP-F), no value needs to be entered for this action.

All keys have now returned to their default value, deactuated, so the chord array is sent to the chord evaluator table and the chord array is then cleaned and emptied.

Conversion Algorithm: some particular movements will not be possible to be performed simultaneously with other particular movements, such as the flexion and extension of the ring finger. In addition, some users may not be able to make particular movements with particular fingers, such as people who have had their finger injured or damaged.

To accommodate both cases, the invention will employ a code table which will provide the mapping, or translating, from a set of keystrokes to a specific character, symbol, or even a set of characters. The above sequence, Chord Sequence 1, produces an ordered set, or an array of values: 0x01, 0x02, 0x03. Sequence is produced by index finger DIP flexion, which instantiated the sequence, followed by PIP flexion, followed by MP flexion. At the end of that sequence the finger switches are released, which concludes the chord and submits the sequence to the interpreter process to produce a character.

The sequence of 0x01, 0x02, 0x03 may be converted into a longer hexadecimal number: 0x010203. The converted string may simply be looked up in a conversion table such as this abbreviated example table:

Input sequence: 0x010202; Output character: "a";
Input sequence: 0x010203; Output character: "b";
Input sequence: 0x010204; Output character: "c";
. . .
Input sequence: 0x090101; Output character: "%";

Since this method even allows for a single keyswitch on a single finger to be pressed more than once during a single chord all the characters of a standard keyboard can be entered in a single chord sequence. Shift, Function, Alt, and Ctrl keys functions can be produced by thumb or finger adduction, or other designated keyswitch, which can be held while keying in a chord sequence. This way all the features of a standard or extended QWERTY keyboard can be provided with the present invention.

Self-Training Feature: such an unusual text input device will require unusual training. Fortunately, in some embodiments, an additional feature of the present invention will make training easier.

Each character input key combination is located to a specific location on the hand. The fact that the hand never needs to be repositioned in the device greatly improves the opportunity to use passive feedback to the tactile sensations of the finger to accelerate training. The invention device will contain haptic feedback motors at each of the keystroke locations. Since each keystroke location is related to the character bring input, the haptic motor signals can stimulate the exact locations of the fingers in the exact same order that the keys need to be pressed in order to enter the keystroke combination.

This means that the keystrokes can be tactilely "taught" to the hand before the user knows how to type on the keyboard. A sequence of audio characters can be played through earphones and then the same characters can be triggered on the haptic motor vibrators. For instance, the audio output can say the letter "a" and then the keystroke sequence for "a" can be indicated by each haptic motor vibrating in the same locations and in the same sequence in which the keystrokes would need to occur. The aforementioned digital display may further aid in this goal.

Possible variations for the structure of the present invention may include embodiments for:

One-finger key
Thumb-key
Finger and thumb key
Two-finger key
Two-finger and thumb key
Three-finger key
Three-finger and thumb key
Four-finger key
Four-finger and thumb key Although the invention has been explained in relation to its preferred embodiment, it is to be understood that many other possible modifications and variations can be made without departing from the spirit and scope of the invention as hereinafter claimed.

What is claimed is:

1. A one-handed input chording user input device for converting finger movements into digital input, comprising:
   a chassis, wherein the chassis is configured to conform to human fingers;
   a plurality of user input elements;
   a processing device;
   a signal transmitter;
   the plurality of user input elements being connected to the chassis;
   the plurality of user input elements being distributed around the chassis;
   the plurality of user input elements being electronically connected to the processing device;
   the processing device being electronically connected to the signal transmitter;
   the chassis comprising a plurality of articulating finger frames;
   the plurality of articulating finger frames being serially positioned adjacent to each other;
   each of the plurality of articulating finger frames comprising a plurality of finger segments and a plurality of hinges, the plurality of finger segments comprising a base segment, a proximal segment and a distal segment, the plurality of hinges comprising a first hinge and a second hinge, the proximal segment being connected adjacent to the base segment through the first hinge, the distal segment being connected adjacent to the proximal segment opposite the base segment through the second hinge, a first user input element from the plurality of user input elements being connected between the base segment and the proximal segment, a second user input element from the plurality of user input elements being connected between the proximal segment and the distal segment, the first user input element being configured to capture a flexion movement of a first joint of a user's finger, the second user input element being configured to capture a flexion movement of a second joint of the user's finger;

wherein the one-handed input chording user input device is configured to collects keystrokes and to interpret the keystrokes as a text character by capturing the flexion movement of the first joint of the user's finger and capturing the flexion movement of the second joint of the user's finger for each finger;

wherein the first user input element and the second user input element each is a momentary switch;

wherein the plurality of user input elements are configured to capture flexion and extension movements of the plurality of articulating finger frames; and wherein the processing device is a logic module, the logic module is configured to accumulate user input signals from the plurality of user input elements into an ordered array while any of the plurality of user input elements is pressed and to interpret the ordered array into the keystrokes when all of the plurality of user input elements are released to off positions.

2. The one-handed input chording user input device for converting finger movements into digital input as claimed in claim 1 comprising:

the plurality of articulating finger frames being serially connected adjacent to each other.

3. The one-handed input chording user input device for converting finger movements into digital input as claimed in claim 1 comprising:

the plurality of user input elements being further configured to capture adduction and abduction movements of the plurality of articulating finger frames.

4. The one-handed input chording user input device for converting finger movements into digital input as claimed in claim 1 comprising:

the base segment of an arbitrary articulating finger frame from the plurality of articulating finger frames being connected adjacent to the base segment of an adjacent articulating finger frame from the plurality of articulating finger frames, wherein the arbitrary articulating finger frame is connected adjacent to the adjacent articulating finger frame.

5. The one-handed input chording user input device for converting finger movements into digital input as claimed in claim 1 comprising:

at least one adduction element from the plurality of user input elements being connected to an arbitrary articulating finger frame from the plurality of articulating finger frames; and the at least one adduction element being positioned between the arbitrary articulating finger frame and an adjacent articulating finger frame.

6. The one-handed input chording user input device for converting finger movements into digital input as claimed in claim 1 comprising:

each of the plurality of user input elements being configured to provide user feedback upon actuation.

7. The one-handed input chording user input device for converting finger movements into digital input as claimed in claim 1 comprising:

at least one of the plurality of user input elements being a tactile momentary switch.

8. The one-handed input chording user input device for converting finger movements into digital input as claimed in claim 1 comprising:

a digital display; and the digital display being electronically connected to the processing device.

9. The one-handed input chording user input device for converting finger movements into digital input as claimed in claim 1 comprising:

the processing device being configured to store user input signals received from the plurality of user input elements.

* * * * *